March 25, 1924.

W. H. WILCOX

WHEEL PULLER

Filed July 12, 1921

Inventor
W. H. Wilcox,
By
Attorney

Patented Mar. 25, 1924.

1,488,423

UNITED STATES PATENT OFFICE.

WINTHROP H. WILCOX, OF NEW HAVEN, CONNECTICUT, ASSIGNOR OF THREE-FIFTHS TO STEPHEN W. SPENCER, OF NEW HAVEN, CONNECTICUT.

WHEEL PULLER.

Application filed July 12, 1921. Serial No. 484,068.

*To all whom it may concern:*

Be it known that WINTHROP H. WILCOX, a citizen of the United States of America, residing at New Haven, in the county of New Haven and State of Connecticut, has invented new and useful Improvements in Wheel Pullers, of which the following is a specification.

The object of the invention is to provide a simple and efficient tool whereby wheels may be removed from their spindles with the utmost expedition and under conditions minimizing the tendency to mar the finish of the spokes or other portions thereof; and with this object in view the invention consists in a construction and combination of parts of which a preferred embodiment is shown in the accompanying drawings, wherein.

Figure 1:
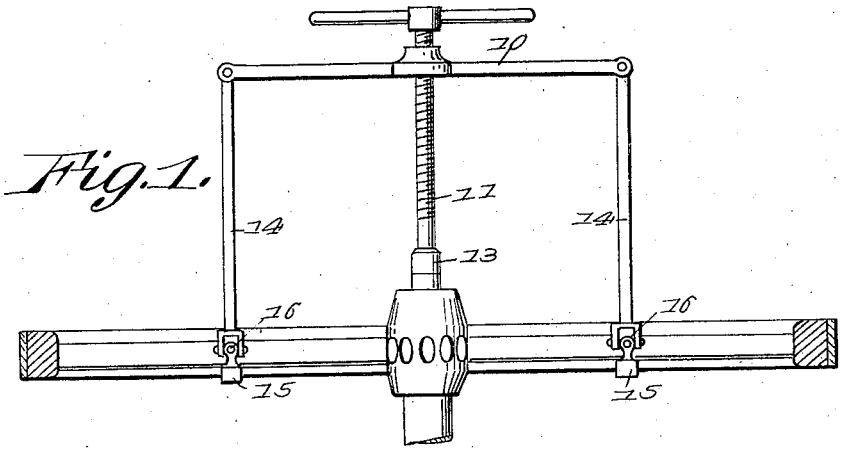
Figure 1 is a side view of a tool embodying the invention applied in the operative position to a wheel.
Figure 2:
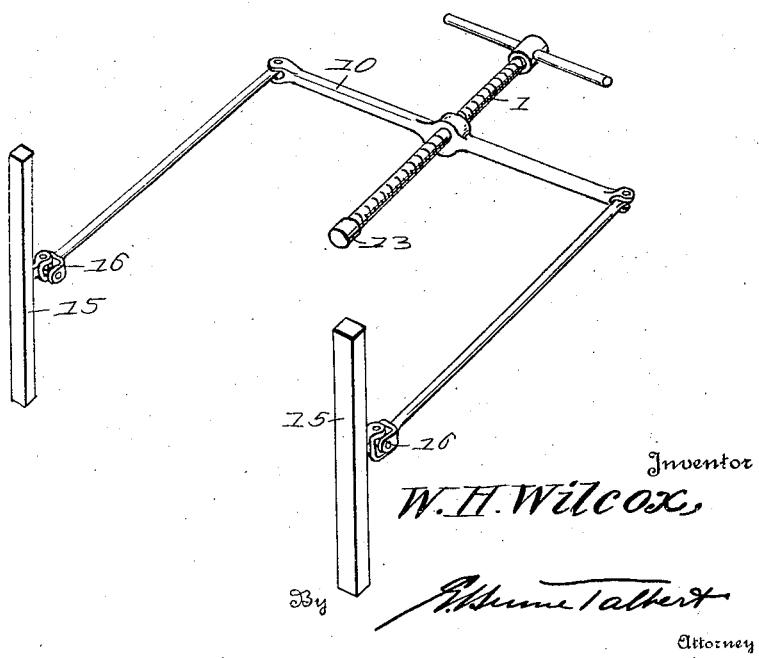
Figure 2 is a detail view of the tool detached.

The device consists of a cross head 10 which may be as illustrated in the form of a bar in which at its center is threaded a jack screw 11 having a grip bar 12 at its outer end and a bearing head 13 at its inner end for contact with the end of an axle spindle as indicated in Figure 1, and connected with the extremities of the cross head by means of rods 14 or equivalent tensile means are buttons 15 which are illustrated as bars adapted to be engaged with adjacent spokes of a wheel to exert a pulling strain thereon when the jack screw is adjusted. The connection between the buttons each of which is necessarily elongated to extend from one spoke to another in order to obtain the desired engagement with the wheel, are connected with the tensile members or rods 14 by universal joints 16 to adapt the buttons to lie substantially parallel with the tensile members in applying the tool to a wheel, and after said buttons have been passed between the spokes they may be turned to a position transverse to the tensile members to lie in contact and engaging spanning relation with adjacent spokes to apply the required pressure thereto when the device is operated. The disengagement of the tool after the removal of the wheel may be effected with the same facility as the engagement of the same therewith due to the said universal connection between the buttons and the tensile members.

Having described the invention, what is claimed as new and useful is:—

A wheel removing jack for vehicles having a crossbar carrying a central jack screw and tensile members connected with the terminals of the cross head and provided at their free ends with buttons for engaging and spanning the intervals between adjacent spokes of a wheel to be removed, said buttons being connected with the tensile members by universal joints adapting them to lie in parallelism with the tensile members when inserted between the spokes of the wheel.

In testimony whereof he affixes his signature.

WINTHROP H. WILCOX.